United States Patent [19]

Marsala et al.

[11] Patent Number: 5,129,925
[45] Date of Patent: Jul. 14, 1992

[54] LIQUID DESICCANT REGENERATION SYSTEM

[75] Inventors: Joseph Marsala, N. Chelmsford; Antonios I. Zografos, Framingham, both of Mass.

[73] Assignee: 501 Gas Research Institute, Chicago, Ill.

[21] Appl. No.: 655,558

[22] Filed: Feb. 14, 1991

[51] Int. Cl.$^5$ .............................................. B01D 53/02
[52] U.S. Cl. ........................................ 55/164; 55/32; 55/208
[58] Field of Search .................... 55/32, 164, 208, 218, 55/219; 210/121, DIG. 6; 73/440; 417/40; 202/206; 203/1, DIG. 18

[56] References Cited

U.S. PATENT DOCUMENTS

| | | | |
|---|---|---|---|
| 2,090,466 | 8/1937 | Bichowski | 55/208 |
| 2,432,887 | 12/1947 | Haviland | 210/121 |
| 2,479,936 | 8/1949 | Kelley | 62/310 |
| 2,600,039 | 6/1952 | Whaley | 73/440 |
| 3,750,369 | 8/1973 | Friedland | 55/32 |
| 4,427,053 | 1/1984 | Klaren | 165/1 |
| 4,519,448 | 5/1986 | Allo et al. | 165/118 |
| 4,939,906 | 7/1990 | Spatz et al. | 62/94 |

*Primary Examiner*—Bernard Nozick
*Attorney, Agent, or Firm*—Lorusso & Loud

[57] ABSTRACT

A liquid desiccant regeneration system for use with a dehumidifying apparatus, the system comprising a water reducer for removing water from diluted desiccant, and a sump for holding concentrated desiccant, first and second bodies movable in the sump, a first of the bodies being operable to energize the water reducer when the desiccant in the sump reaches a selected high water content level, and a second of the bodies being operable to stop operation of the water reducer when the desiccant in the sump reaches a selected low water content level, whereby to maintain the water content of the desiccant in the sump between selected high and low levels.

9 Claims, 1 Drawing Sheet

LIQUID DESICCANT REGENERATION SYSTEM

BACKGROUND OF THE INVENTION

1. Field of the Invention

This invention relates to a liquid desiccant regenerating systems for use with dehumidifying apparatus, and is directed more particularly to a system for maintaining the water content of desiccant within a selected range.

2. Description of the Prior Art

The use of liquid desiccants, such as lithium chloride and calcium chloride, for dehumidifying air is well known. In the course of removing water from the air, the desiccant absorbs moisture, becomes diluted, and must be regenerated, that is, must be stripped of its water content to a degree such that the desiccant is relatively concentrated and more readily able to absorb moisture from the air.

Regeneration usually requires heating the desiccant to drive off the excess water. Alternatively, a hot gas may be passed over the desiccant to absorb the excess moisture. Another alternative regeneration method includes heating the desiccant and passing a gas through the desiccant. In one typical application, the desiccant is conveyed to a boiler, where the dilute liquid desiccant is heated and the excess moisture is removed in the form of steam. The resulting concentrated desiccant is then conveyed, though heat exchange means, to a desiccant reservoir, or sump, from which the desiccant is drawn for dehumidifying operations.

In such systems, it is critical that the proper concentration of desiccant be discharged from the sump for use in the dehumidifying system.

In systems in common use, a level sensor and switch monitors the level of desiccant in the sump, but not the concentration, or density, of the desiccant. In the event of a desiccant leak or overcharge, the sensors detect the change in level, which is interpreted to indicate an erroneous desiccant concentration.

It is deemed desirable to have available a system by which the density, and thereby water content, of the desiccant is maintained in a desired range, without regard to the level of the desiccant in the desiccant sump.

SUMMARY OF THE INVENTION

It is, therefore, an object of the invention to provide a desiccant regeneration system having means for automatically maintaining the water content of the desiccant within a pre-selected range.

With the above and other object in view, as will hereinafter appear, a feature of the present invention is the provision of a liquid desiccant regeneration system for use with a dehumidifying apparatus, the system comprising water reduction means adapted to receive a dilute desiccant, remove water from the desiccant, and discharge a relatively concentrated desiccant, a sump for holding the desiccant, first and second bodies disposed in the sump and freely movable therein, a first of the bodies being operable to energize the water reduction means when the desiccant in the sump reaches a selected high water content level, and a second of the bodies being operable to stop operation of the water reduction means when the desiccant in the sump reaches a selected low water content level, whereby to maintain the water content of the desiccant in the system between the selected high and low water content levels.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawing in which is shown an illustrative embodiment of the invention, from which its novel features and advantages will be apparent.

In the drawings.

DESCRIPTION OF THE PREFERRED EMBODIMENT

Figure 1:
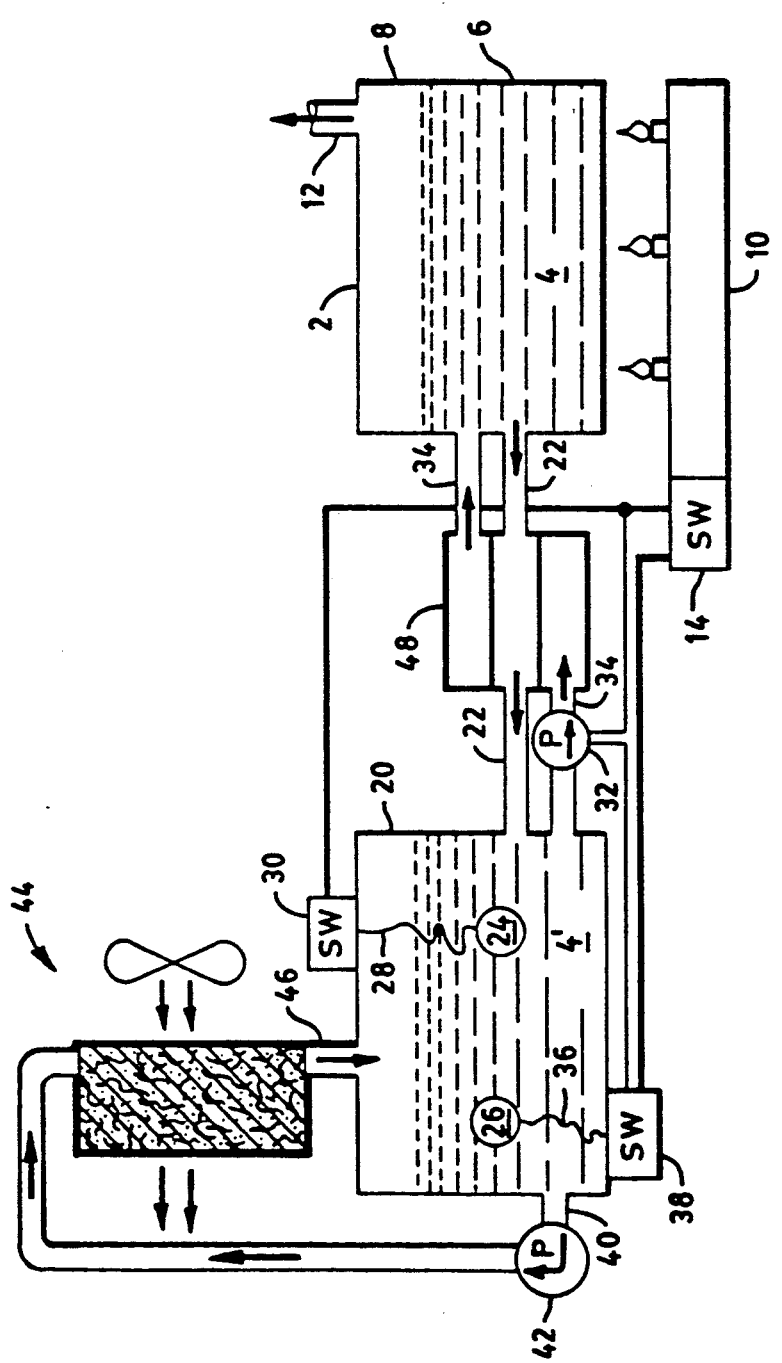
FIG. 1 is a diagrammatic representation of a liquid desiccant regeneration system illustrative of an embodiment of the invention.

Referring to the drawing, it will be seen that an illustrative embodiment of the invention includes a means 2 for reducing the water content of desiccant 4. The water content reducing means 2 may comprise a boiler 6, as shown diagrammatically in FIG. 1, or may comprise an alternative means for reducing water content of desiccant, such as a hot gas flow apparatus adapted to flow a heated gas over the desiccant to absorb moisture from the desiccant (not shown). The boiler 6 includes a tank 8 for holding a quantity of the desiccant 4, heat supply means 10 for heating the desiccant 4, and vent means 12 for discharging the separated moisture in the form of steam. A water reduction switch means 14 is operative to start and stop the heat supply means 10. Operation of the heat supply means 10 serves to vaporize moisture in the desiccant 4, to reduce the water content of the desiccant, thereby to increase the concentration and density of the desiccant, thereby to enhance the ability of the desiccant subsequently to absorb moisture.

The system further includes a sump 20 adapted to receive and retain desiccant 4' acted upon by the water content reducing means 2. A supply conduit 22 interconnects the boiler tank 8 and the sump 20, and facilitates the flow of relatively concentrated desiccant from the water content reducing means 2 to the sump 20.

Disposed in the sump 20 are first and second flotation bodies 24, 26, which, in the embodiment shown in the drawing, are freely movable in the sump 20. The first 24 of the flotation bodies is provided with a selected first density which exceeds the lowest density desired for the desiccant 4' in the sump. The second 26 of the flotation bodies is provided with a selected second density which is less than the highest density desired for the desiccant 4'.

The first body 24 is operatively connected, as by a first cord 28, to a first switch 30, which in turn is operatively connected to the water reduction switch means 14 and to a circulating pump 32 in a return conduit 34 adapted to convey desiccant from the sump 20 to the water content reduction means 2.

Similarly, the second body 26 is operatively connected, as by a second cord 36, to a second switch 38, which in turn is operatively connected to the water reduction switch means 14 and to the circulating pump 32.

The sump 20 is provided with a discharge conduit 40 through which the relatively concentrated desiccant 4' of the sump 20 is moved by a feed pump 42 from the sump 20 to a dehumidifying apparatus 44. The dehumidifying apparatus 44 is provided with a drain 46, which facilitates return of the desiccant from the dehumidifying apparatus 44 to the sump 20. In the apparatus 44, the desiccant absorbs moisture from the air being dehumidified and returns to the sump 20 in a less concentrated condition than when it left the sump.

The supply and return conduits 22, 34 typically are passed through a heat exchanger 48, so that the desiccant leaving the water content reducing means 2 is cooled before entering the sump 20, and the desiccant leaving the sump 20 is heated before entering the water content reducing means 2.

In operation, relatively concentrated desiccant is conveyed from the boiler tank 8 to the sump 20, by way of the supply conduit 22, and from and the sump 20, by way of the discharge conduit 40, to the dehumidifying apparatus 44, from whence the desiccant drains back into the sump 20, in a less concentrated condition, having gained moisture from the air in the apparatus 44.

It is desirable to maintain the concentration of lithium chloride (LiCl) desiccant in the sump in a range of about 38%–44%. As the desiccant draining from the dehumidifying apparatus lowers the concentration, and thereby the density, of the desiccant in the sump, the first flotation body 24, which is of a density greater than that of 38% LiCl, say equivalent to 38.5% LiCl for example, becomes more dense relative to the desiccant. When the density of the desiccant passes 38.5% while dropping, the first flotation body 24 becomes more dense that the desiccant and sinks toward the bottom of the sump 20. Continued sinking of the body 24 pulls the core 28 which operates the first switch 30 which, in turn, operates the water reduction switch means 14 to turn on the water content reducing means, and starts the circulating pump 32 to convey desiccant from the sump 20 to the water content reducing means 2. In the water reducing means 2, water is removed from the desiccant which is returned, more concentrated, to the sump 20, causing the concentration of the desiccant in the sump 20 to rise and the first flotation body 24 to rise.

The second flotation body 26 is provided with a density of less than that of 44% LiCl, as for example equivalent to 43.5% LiCl, so that at the density of the desiccant in the sump 20 increases, the second flotation body becomes less dense relatively to the desiccant. When the density of the desiccant passes 43.5% while rising, the second flotation body 26 becomes less dense that the desiccant and rises toward the top of the sump 20. Continued rising of the body 26 pulls the cord 36, which operates the second switch 38 which, in turn, operates the water reduction means switch 14 to turn off the water content reducing means, and to stop operation of the circulating pump 32. The system then remains at rest until the concentration of the desiccant in the sump again falls to just over 38.0%.

Thus, there is provided a system for maintaining the concentration of the desiccant in a preselected range, the system being independent of the level of the desiccant in the sump.

It is to be understood that the present invention is by no means limited to the particular construction herein disclosed and/or shown in the drawings, but also comprises any modifications or equivalents within the scope of the claims. For example, the flotation bodies may be slidably disposed on vertical rods and adapted to actuate switches at given points in their travels along their respective rods. In another alternative embodiment, the vertical position of the bodies are detected by photoelectric cells which operate the circulating pump and water content reducer heating means. While a system utilizing LiCl has been described above, it will be apparent that other desiccants may be used and that desired concentrations and densities of such alternative desiccants may well be substantially different from those noted above relative to LiCl.

Having thus described our invention, what we claim as new and desire to secure by Letters Patent of the United States is:

1. A liquid desiccant regeneration system for use with a dehumidifying apparatus, said system comprising a sump, a water reduction means adapted to remove water from the desiccant, a supply pipe interconnecting said water reduction means and said sump for conveying desiccant from said water reduction means to said sump, a return pipe interconnecting said sump and said water reduction means for conveying desiccant from said sump to said water reduction means, first and second flotation bodies movable in the desiccant in said sump, first switch means for starting said water reduction means, second switch means for stopping said water reduction means, the first of said bodies having thereon means for tripping said first switch means, said first body being operable in response to movement thereof in the desiccant in said sump to trip said first switch means to energize said water reduction means when said desiccant in said sump reaches a selected high water content level, and the second of said bodies having thereon means for tripping said second switch means, said second body being operable in response to movement thereof in said desiccant in said sump to trip said second switch means to stop operation of said water reduction means when said desiccant in said sump reaches a selected low water content level, whereby to maintain said water content of said desiccant in said sump between said selected high and low water content levels.

2. The liquid desiccant regeneration system in accordance with claim 1 in which said water reduction means comprises a boiler adapted to vaporize moisture content of said desiccant therein, said boiler having means for discharging said vaporized moisture.

3. The liquid desiccant regeneration system in accordance with claim 1 wherein said first body is of a density more than a lowest density desired for said desiccant in said sump, and said second body is of a density less than a highest density desired for said desiccant in said sump.

4. A liquid desiccant regeneration system for use with a dehumidifying apparatus, said system comprising means for reducing water content of desiccant to increase the density of said desiccant, a sump for retaining desiccant acted upon by said water content reducing means, conduit means extending from said means for reducing water supply content to said sump and adapted to convey desiccant from said means for reducing water content to said sump, a return conduit extending from said sump to said water content reducing means for conveying desiccant from said sump to said water content reducing means, first and second flotation bodies disposed in and freely movable in said desiccant in said sump, a first of said bodies having a selected first density greater than a lowest density desired for said desiccant in said sump, a second of said bodies having a selected second density less than a highest density desired for said desiccant in said sump, said first body having thereon means for tripping a first switch means, said second body having thereon means for tripping a second switch means, said first switch means being operatively connected to said first body switch tripping means and to said water content reducing means, and said second switch means being operatively connected to said second body switch tripping means and said water content reducing means, whereby upon accretion of water content in said desiccant in said sump to a point at which said density of said desiccant is less than said first density, said first body is adapted to move in a first direction to cause said first body switch tripping means to operate said first switch means to initiate operation of said water content reducing means, and whereby upon reduction of water content of said desiccant in said sump to a point at which said density of said desiccant is more than said second density, said second body is adapted to move in a second direction to cause said second body switch tripping means to operate said second switch means to stop operation of said water reducing means, whereby to maintain the density of said desiccant in said sump substantially between first and second water content levels.

5. The liquid desiccant regeneration system in accordance with claim 4 wherein said first body means for tripping said first switch means and said second body means for tripping said second switch means each comprise a cord.

6. The liquid desiccant regeneration system in accordance with claim 4, and further including a circulating pump disposed in said return conduit, said first and second switch means being operatively connected to said circulating pump and adapted to turn on said circulating pump when said operation of said water content reducing means is initiated, and adapted to turn off said circulating pump when said operation of said water content reducing means is stopped.

7. The liquid desiccant regeneration system in accordance with claim 4 in which said first direction is toward a bottom of said sump and said second direction is toward a top of said sump.

8. The liquid desiccant regeneration system in accordance with claim 7 in which said lowest and highest densities are equal, respectively, to aqueous LiCl desiccant concentrations of about 38%–44%.

9. The liquid desiccant regeneration system in accordance with claim 8 in which said selected first density corresponds to an aqueous LiCl desiccant concentration of about 38.5% and said selected second density corresponds to an aqueous LiCl desiccant concentration of about 43.5%.

* * * * *